US005687249A

United States Patent [19]
Kato

[11] Patent Number: 5,687,249
[45] Date of Patent: Nov. 11, 1997

[54] METHOD AND APPARATUS FOR EXTRACTING FEATURES OF MOVING OBJECTS

[75] Inventor: Koichi Kato, Yokohama, Japan

[73] Assignee: Nippon Telephone and Telegraph, Tokyo, Japan

[21] Appl. No.: 299,072

[22] Filed: Sep. 1, 1994

[30] Foreign Application Priority Data

Sep. 6, 1993 [JP] Japan ................................. 5-221216
May 25, 1994 [JP] Japan ................................. 6-110797

[51] Int. Cl.$^6$ ................................. G06K 9/00; G08G 1/01; H04N 7/00; H04N 5/14
[52] U.S. Cl. ................................. 382/104; 382/190; 340/936; 348/25; 348/577; 348/700
[58] Field of Search ................................. 382/104, 190, 382/100; 340/937, 936, 935, 934; 358/105; 348/135, 577, 578, 136, 700, 25

[56] References Cited

U.S. PATENT DOCUMENTS

| | | | |
|---|---|---|---|
| 4,709,264 | 11/1987 | Tamura et al. | 340/937 |
| 4,866,438 | 9/1989 | Knisch | 340/936 |
| 5,083,200 | 1/1992 | Deffontaines | 358/105 |
| 5,097,327 | 3/1992 | Hasebe | 358/105 |
| 5,103,305 | 4/1992 | Watanabe | 358/105 |
| 5,206,503 | 4/1993 | Toops | 250/234 |
| 5,301,239 | 4/1994 | Toyama et al. | 382/104 |
| 5,347,588 | 9/1994 | Wilson | 382/104 |
| 5,414,474 | 5/1995 | Kamada et al. | 348/700 |
| 5,475,422 | 12/1995 | Mori et al. | 348/48 |

*Primary Examiner*—Leo Boudreau
*Assistant Examiner*—Monica S. Davis
*Attorney, Agent, or Firm*—Pollock, Vande & Priddy

[57] ABSTRACT

The present invention is intended to reconstruct or acquire the shape of an object without rotating it. A TV camera with a fish-eye lens is used to conduct the image-sensing of a vehicle as a moving object over a certain section of its path of travel and a background image is subtracted from each captured image to obtain a silhouette of the vehicle. The loci of movement of the vehicle's tires in each image are calculated and used to calculate the positions of the viewpoint of the TV camera and the vehicle relative to each other in each image. The shape of the vehicle is reconstructed by projecting the silhouette for each captured image into a projection space while holding the viewpoint of the TV camera and the vehicle at the calculated relative positions.

14 Claims, 13 Drawing Sheets

BACK-GROUND IMAGE 38

FIG. 4B

SILHOUETTE IMAGE 39

SPHERICAL SURFACE
41
15
42
SPHERICAL PROJECTION IMAGE
43
VERTICAL PLANE PARALLEL TO DIRECTION OF TRAVEL
44 PLANAR PROJECTION IMAGE
DIRECTION OF TRAVEL 13

FIG. 5B

DIRECTION OF TRAVEL
13
A
B

73 BACKGROUND IMAGE
72 INPUT IMAGE
75 LARGE OBJECT IMAGE
74 DIFFERENCE IMAGE

FIG. 15B

76 FIRST INPUT IMAGE
77 INPUT IMAGE
78 DIFFERENCE IMAGE

METHOD AND APPARATUS FOR EXTRACTING FEATURES OF MOVING OBJECTS

BACKGROUND OF THE INVENTION

The present invention relates to a method and apparatus for extracting the shape or surface texture or feature of a moving object such as a moving car or part being carried on a belt conveyor.

Heretofore, there have been studied noncontact type three-dimensional (3-D) data input methods intended for part inspection or object identification. The methods proposed so far are mostly directed to the extraction of three-dimensional information from image information. Of such approaches, a method of the type utilizing silhouettes of the target object permits relatively easy reconstruction of its shape. This is disclosed in, for example, H. Busch, "Automatic modelling of rigid 3D objects using an analysis by synthesis system," In Proc. of SPIE Symposium on Visual Communication and Image Processing proceedings, Vol. 9, pp. 301–315, 1979. This silhouette method extracts silhouettes of the object from image sequences captured by image-sensing of the object from a plurality of directions and reconstructs the 3-D shape directly from the silhouette contours. In this instance, a conventional method of image-sensing an object placed on a turntable can be used to acquire image sequences from a plurality of directions, but the size and weight of the target object are limited. Alternatively, image sequences can be captured through a plurality of cameras directed to the object from a plurality of direction. In this approach, however, the positional relationship between the cameras is so important that they must be installed with very high precision, besides the cameras need to be calibrated individually. In either case, even if the system flexibility for image-sensing environment is enhanced, the conventional image capturing method is not suitable for real world outdoor applications.

SUMMARY OF THE INVENTION

According to the present invention, images of a moving object are captured by a TV camera two or more times in a predetermined section and silhouettes of the moving object are each generated on the basis of the difference between object and background images acquired through the TV camera. Information about feature points of the moving object in each image is used to calculate the relative positions of the TV camera's viewpoint and the moving object, then each silhouette is projected into a projection space, with the above-said positional relationship between the camera viewpoint and the moving object held unchanged, to acquire or reconstruct the shape of the moving object.

In capturing the image of the moving object, the TV camera may be fixed and, in this case, it may preferably be equipped with a wide-angle objective lens; alternatively, the camera may be made to freely turn to keep or capture the moving object in its field of view at all times.

The background image may be prepared in advance; otherwise, it is derived from the captured object images at proper intervals. In the calculation of the above-mentioned relative position, each captured image is projected onto a spherical surface, the projected image is then projected onto a planar surface, and such projected images onto the planar surface are arrayed on the time axis to form a spatio-temporal image, from which the image of the line of contact of the moving object with the ground (hereinafter referred to as the ground-contact-line image of the moving object) is detected. Then, the angle which the line joining the lens center or viewpoint of the TV camera and the ground-contact line corresponding to the ground-contact-line image forms with the optical axis of the TV camera is calculated and this angle is used to calculate the position of the moving object relative to the viewpoint of the TV camera. Furthermore, the distance between the TV camera and the moving object at a predetermined position is calculated from the above-mentioned angle between the ground-contact line and the optical axis of the TV camera at the predetermined position and the speed of the moving object is calculated from the slope of the detected ground-contact-line image. The thus obtained speed, the image captured at the predetermined position and the time elapsed until capturing another image are used to calculate the distance of the object's displacement from the above-said predetermined position to another.

The area of the reconstructed shape of the moving object which corresponds to the object surface desired to observe is split into minute patches, and pieces of information about the luminance, color and the like of each patch in each captured image, which corresponds to each split patch, are taken out and statistically processed to obtain the value of each patch.

DESCRIPTION OF THE PREFERRED EMBODIMENTS

Figure 1A:
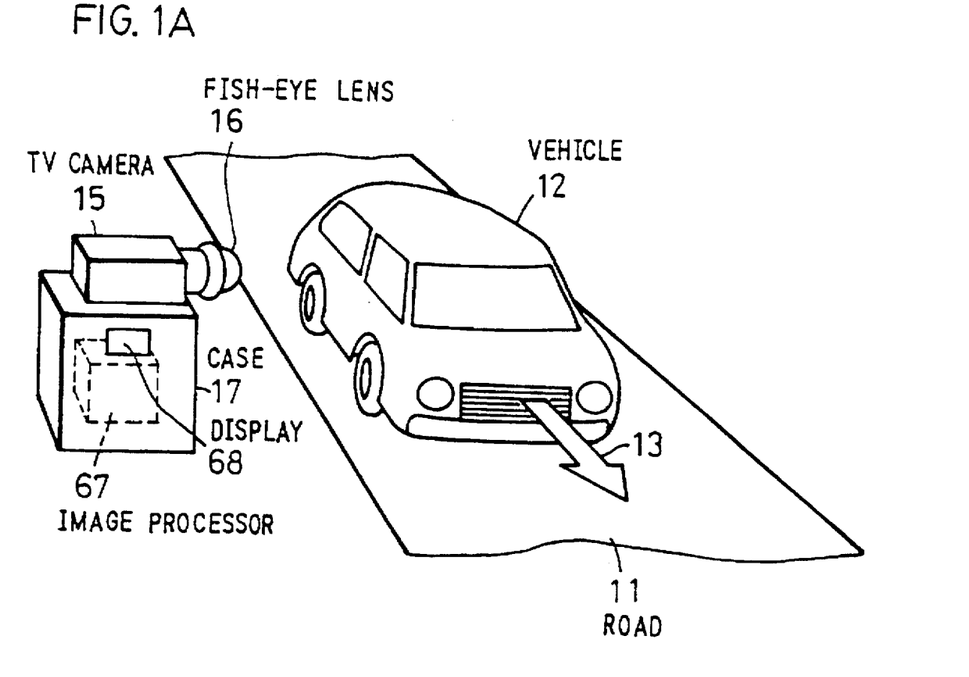
FIG. 1A is a perspective view illustrating an embodiment of the apparatus for extracting features of moving objects according to the present invention.
Figure 1B:
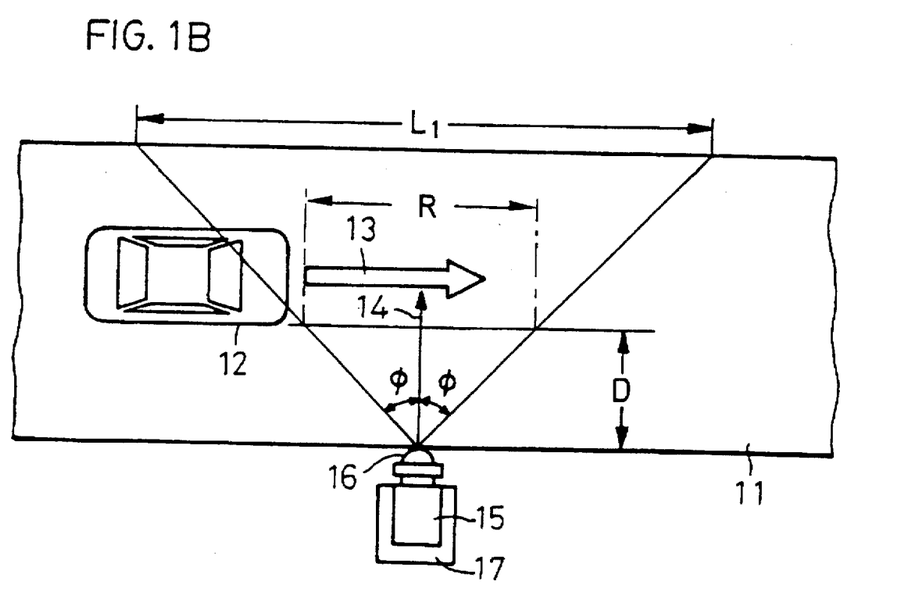
FIG. 1B is a plan view of the FIG. 1 embodiment.

FIGS. 1A and 1B illustrate an embodiment of the present invention applied to the reconstruction of the shape of a moving vehicle. Assume that a vehicle 12 moves on a road 11 in the direction indicated by the arrow 13. A TV camera 15 is installed with its optical axis 14 intersecting the direction 13 of movement of the vehicle 12. In this embodiments the optical axis 14 of the TV camera 15 is held at right angles to the direction of travel 13. An extra-wide angle lens or so-called fish-eye lens 16 is used as an objective lens of the TV camera 15. An image processor 67 is provided in a case 17 on which the TV camera 15 is mounted.

The image-sensing of the moving object or vehicle 12 is conducted two more times in a predetermined section $L_1$ on the road 11 in the direction of travel of the vehicle 12. The section $L_1$, in this example, is chosen so that the point of intersection of the direction of travel 13 and the optical axis 14 of the TV camera 15 is at the center of the section $L_1$. When the vehicle 12 enters the section $L_1$, the TV camera 15 starts image sensing and stops when the vehicle 12 goes out of the section $L_1$. The TV camera 15 takes images of the vehicle 12 at intervals of 1/30 sec.

In this way, images of the vehicle 12 are captured in an image input step 21 in the procedure of FIG. 2 and the thus captured images are subjected to such processing as described below. At first, in a background generating step 22 a background image without the real image of the vehicle 12 is estimated from the images captured through the TV camera 15. In general, the real image of the moving object can be carved out of the captured image by detecting the difference between the real and background images. Under the actual environment, the brightness and color of the background image vary with time and weather; hence, to acquire a correct or accurate real image of the moving object or vehicle, it is necessary to accurately obtain the background image and update it in accordance with environmental changes. To meet this requirement, this embodiment makes it a rule to generate the background image from the image sequence containing the vehicle to be extracted and obtain the real image of the vehicle by the differentiation processing. In the reconstruction of the background image, the input images, for example, are arrayed in time sequence to generate a spatio-temporal image. From the time sequence of the values of the same pixel at the same coordinates in the spatio-temporal image, it is estimated that the time during which the same pixel concerned belonged to formed the background image is sufficiently longer than the time during which the same pixel belonged to the real image of the vehicle. Thus, the pixel value in the pixel value time sequence which takes the highest frequency value is selected for each pixel to form the background image.

Figure 3:
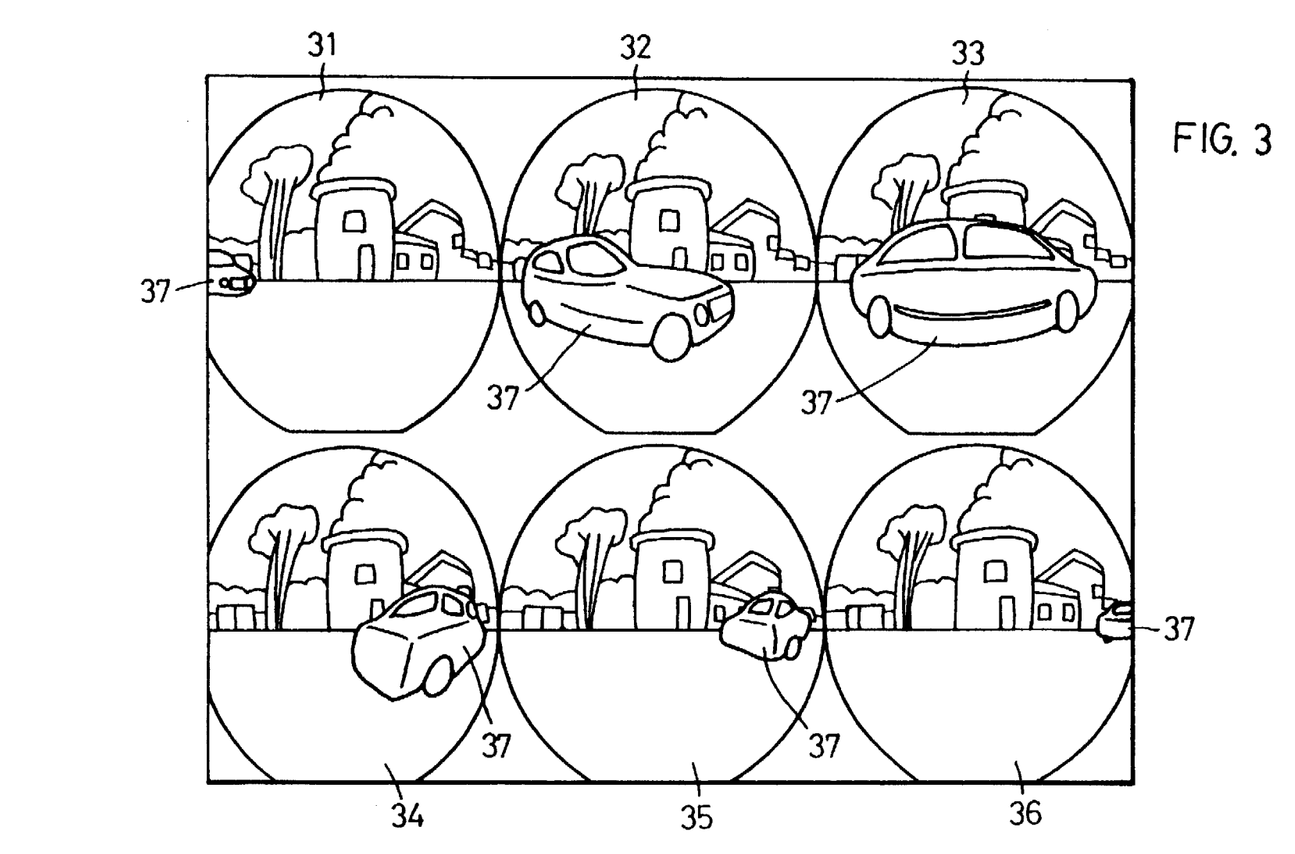
FIG. 3 is a diagram showing, byway of example, a sequence of images captured with the lapse of time.
Figure 4A:
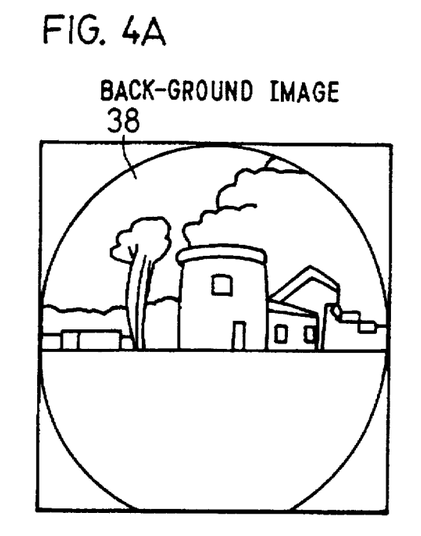
FIG. 4A is a diagram showing an example of a background image in FIG. 3.

Now, consider that successive images 31–36 shown in FIG. 3 were captured by the TV camera 15 until the vehicle 12 left the section $L_1$ after entering it. These images 31–36 are subjected to the above-mentioned processing to obtain such a background image 38 as depicted in FIG. 4A. The production of the background image is disclosed in detail in, for example, T. Nakanishi and K. Ishi, "Automatic Vehicle Image Extraction Based on Spatio-Temporal Image Analysis," International Conference on Pattern Recognition 1992, ICPR 92, p. 500–504.

Figure 4B:
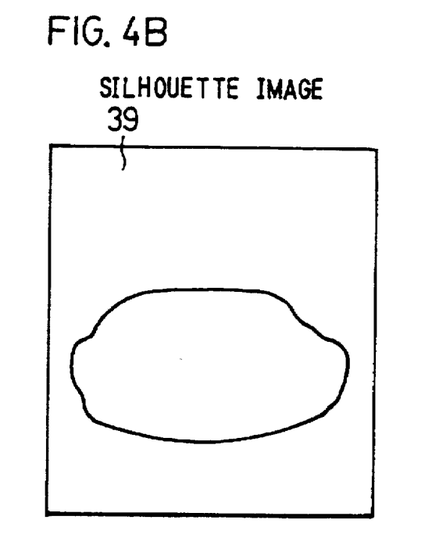
FIG. 4B is a diagram showing an example of a silhouette image of a moving object acquired from the image depicted in FIGS. 3 and 4A.

Next, in a silhouette extraction step 23 (FIG. 2), the background image 38 is subtracted from the sequence of images 31–36 captured from the TV camera 15 and the difference is coded into binary form to obtain a silhouette image. For example, subtracting the background image 38 from the image 33 in FIG. 3, a silhouette image 39 of the vehicle 12 shown in FIG. 4B can be generated. Similarly, the background image 38 is subtracted from the individual images 31, 32 and 34–36, by which silhouette images of the vehicle 12 in the respective scenes are obtained.

Figure 5A:
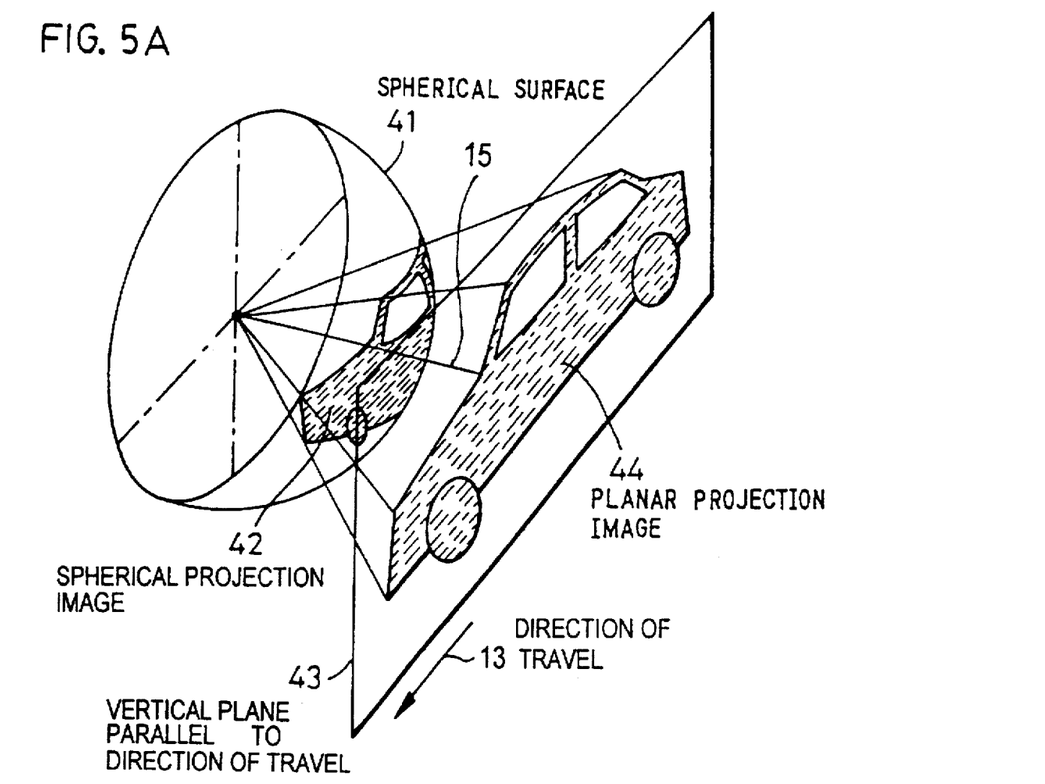
FIG. 5A is a diagram showing how an acquired image is projected onto a spherical surface and then onto a planar surface.

Next, in a relative position calculation step 24, surface features of the vehicle 12 in each captured image are used to calculate the relative positions of the vehicle 12 and the viewing point of the TV camera 15 at that time. To perform this, each captured image, that is, the input image captured through the fish-eye lens 16, is projected onto a spherical surface 41, as shown in FIG. 5A, to thereby obtain a spherical projection image 42 (FIG. 2, step 24a). The spherical projection image 42 is, in turn, projected onto a planar surface or plane 43 which is parallel to the direction of travel 13 of the vehicle 12 and perpendicular to the optical axis 14 of the TV camera 15 (a plane perpendicular to the ground). By this, a planar projection image 44 is formed (step 24b). To convert the input image from the TV camera 15 into the spherical projection image 42, it is necessary to prestore internal parameters of the TV camera 15. With a method described in, for example, Juyan Weng, "Camera Calibration with Distortion Model and Accuracy Evaluation," PAMI 1992, Vol. 14, No. 10, it is possible to obtain the focal distance, lens aberration and image center in the camera optical system. Through utilization of these parameters, the X-Y coordinate system of the TV camera 15 can be transformed to the polar coordinate system with its optical axis at the zenith; this transformation is equivalent to the spherical projection of the input image. The direction of travel of the vehicle 12 is detected as mentioned below after projecting the spherical projection image onto the planar surface 43.

(a) The course of passage of the vehicle is preset and the vehicle is forced to move along the preset course.

Figure 4C:
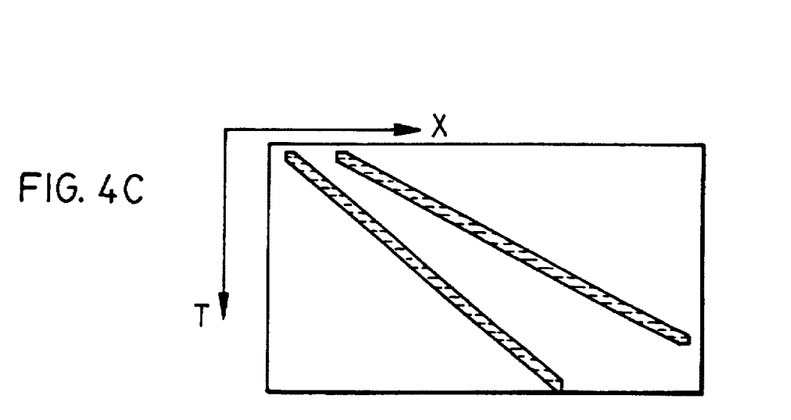
FIG. 4C is a diagram showing images of the loci of vehicle's tires in the case where the direction of movement of a vehicle and the projection surface are not parallel to each other.
Figure 4D:
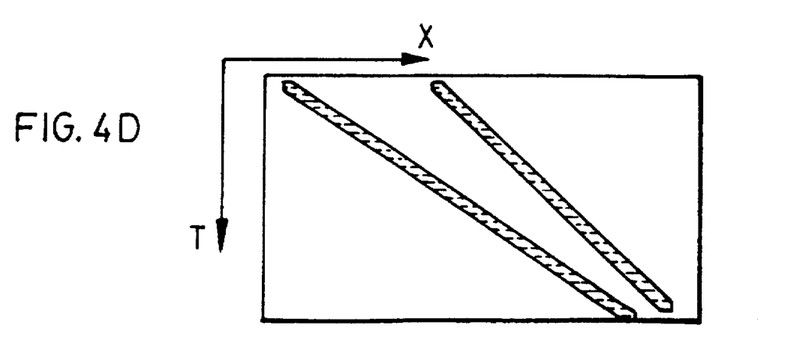
FIG. 4D is a diagram showing another example of the images of the loci of vehicle's tires in a similar situation.
Figure 5B:
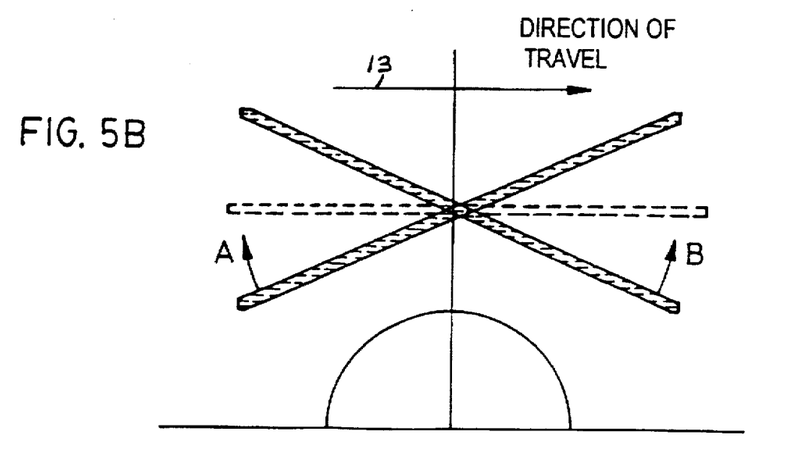
FIG. 5B is a diagram for explaining the manipulation of making the direction of movement of the vehicle and the projection surface parallel to each other.

(b) A desired direction of travel is preset and the projection plane is set in parallel thereto. The spherical and planar projection images are arrayed in parallel on this projection plane along the time axis to obtain a spatio-temporal image and its horizontal section images are analyzed. This will be described later on. The planar surface or plane 43 is re-set depending on whether the tire loci of front and rear wheels of the vehicle 12 that are observed on the display screen go away from each other along the time axis T as shown in FIG. 4C or approach each other as shown in FIG. 4D. That is, the planar surface 43 is re-set to turn the tire loci, as shown in FIG. 5B, in the direction A in the case of FIG. 4C and in the direction B in the case of FIG. 4D so that they become parallel to each other. Namely, the angle of rotation in the direction A or B is obtained from the difference between the inclination angles of the two tires' loci. The above processing is repeated until the two tires' loci become parallel to each other, thereby providing the plane parallel to the direction of travel of the moving object.

(c) For example, in the case of a part or product being carried on a belt conveyor, the direction of travel with respect to the TV camera 15 can be premeasured as in the case (a); therefore, the premeasured direction is input into the apparatus in advance.

In parallel to the direction of travel thus obtained, the projection plane or surface is set at a desired distance from the position of the TV camera 15 and the spherical projection image is projected onto this planar surface 43 as shown in FIG. 5A. After this, the distance between the TV camera 15 and the vehicle 12 is measured by a spatio-temporal section analysis and then the projection plane is translated accordingly.

The distance between the vehicle 12 in the image projected onto the previous projection plane and the vehicle 12 in the image projected onto the current translated plane is equal to the actual distance of travel of the vehicle 12. Hence, the speed of the vehicle 12 is obtained by making a spatio-temporal analysis of the images projected onto the planar surface 43.

Figure 6:
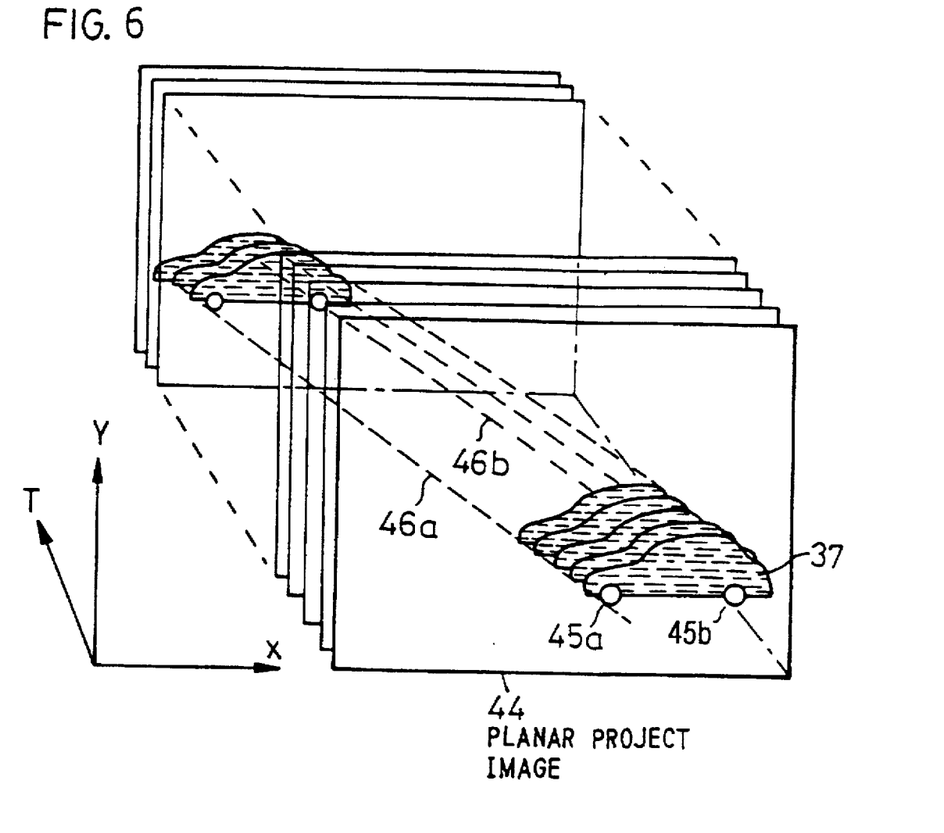
FIG. 6 is a diagram showing an example of a spatio-temporal image.

Next, such planar projection images obtained from respective captured images as mentioned above are sequentially arrayed along the time axis T in order of image sensing as shown in FIG. 6, the time axis T being perpendicular to both of the abscissa X and the ordinate Y axes. By this, a spatio-temporal image is obtained (FIG. 2, step 24c). Note images 45a and 45b of the vehicle's tires at the contact points with the ground in respective images 37 in the spatio-temporal image (which images 45a and 45b are surface feature images of the vehicle 12). The lines 46a and 46b joining the feature point images 45a and 45b are images of the tires' loci on the road 11. The larger the inclination angles of the images of the tires' loci to the time axis T, the higher the speed of the vehicle 12. Straight-line images of the tires' loci 46a and 46b indicate that the vehicle 12 moved at a fixed speed during the image-sensing period and curved images indicate a speed change during the image capturing period.

Figure 7A:
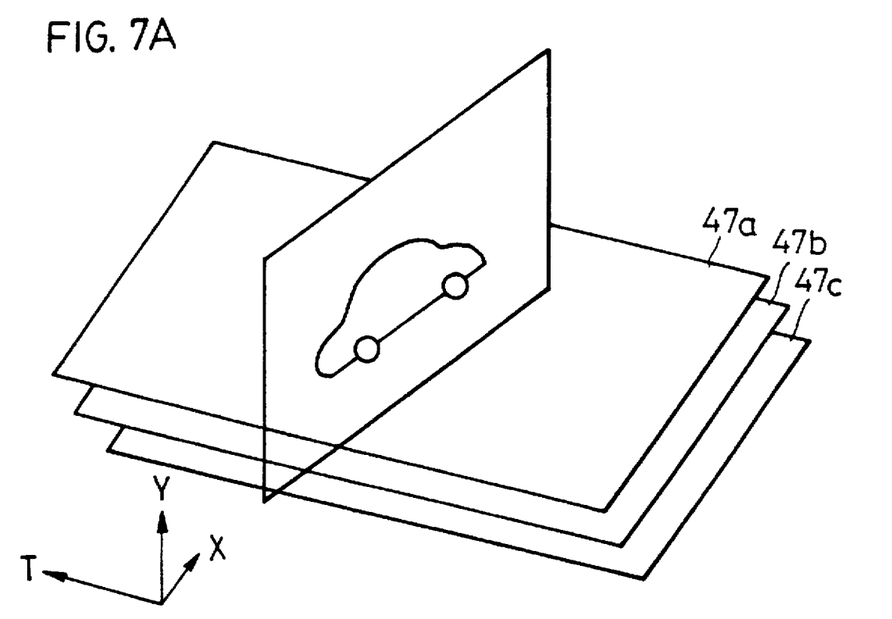
FIG. 7A is a diagram showing respective section planes of horizontal section images of the spatio-temporal image depicted in FIG. 6.
Figure 7B:
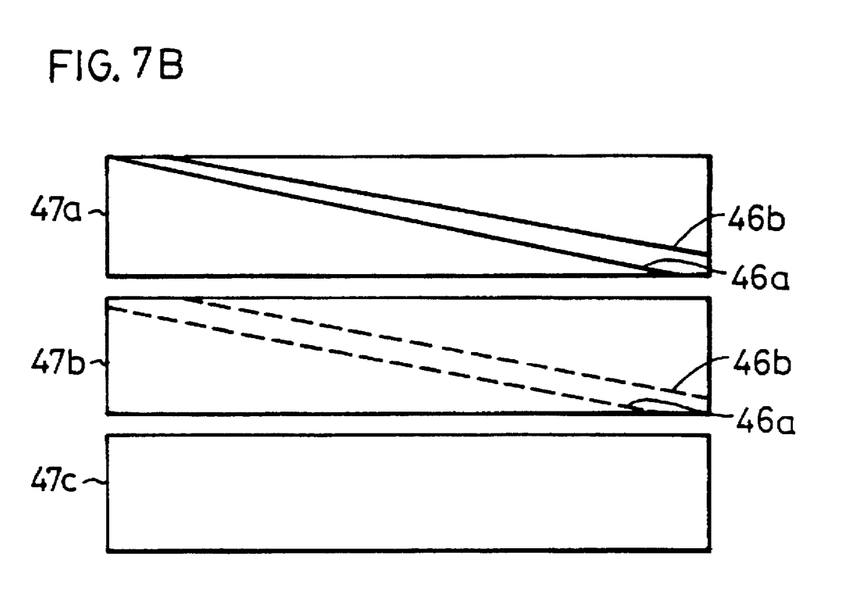
FIG. 7B is a diagram showing respective horizontal section images in FIG. 7A.

Next, horizontal section images 47a, 47b and 47c of the spatio-temporal image are formed in decreasing order of values on the Y axis toward the surface of the road 11 as shown in FIG. 7A. The horizontal section images are searched until the straight lines representing speed component images in respective parts of the vehicle 12, such as tires' loci images 46a and 46b, cease to exit on the horizontal section images 47a, 47b and 47c. The speed component images, immediately before they disappear, are such as indicated by 46a and 46b in FIG. 7B. In this example, the tires' loci images 46a and 46b appear in the horizontal section images 47a and 47b, but in the horizontal section image 47c near the road surface the images 46a and 46b do not exist. In this way, the tires' loci images 46a and 46b are detected (step 24d). Incidentally, the formation of the speed component image of the vehicle 12 involves the detection of straight line components in the horizontal section images 47a, 47b and 47c, for which the Hough transform scheme can be used. The Hough transform scheme is disclosed in, for example, H. H. Baker and R. C. Holles, "Generalizing Epipolar-Plane Image Analysis on the Spatiotemporal Surface," International Journal of Computer Vision 3.33049 (1989), pp. 553–569.

Figure 8:
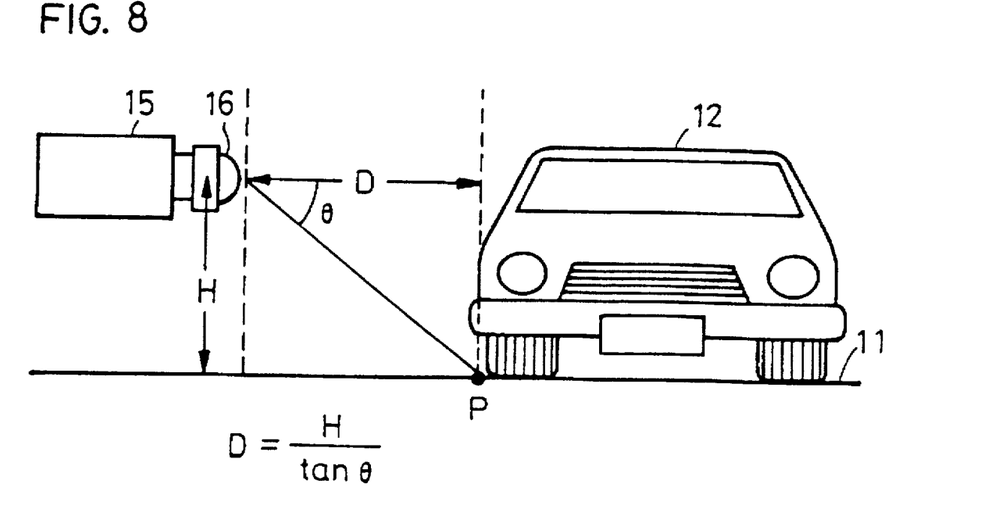
FIG. 8 is a diagram showing the relationship between the angle θ which the line joining the lens center or viewpoint of the TV camera 15 and the point P of contact of a tire of a moving vehicle 12 with the ground noted as a surface feature forms with the optical axis of the TV camera 15 and the distance D between the TV camera 15 and the vehicle 12.

The angle θ (see FIG. 8) which the line joining the thus detected ground-contact point P of the vehicle 12 and the center of the fish-eye lens 16 forms with the horizontal plane is detected and the height of the TV camera 15, that is, the height H of the optical axis 14 from the ground is preknown. The distance D from the viewpoint of the TV camera 15 to the vehicle 12 is calculated by the following equation:

$$D=H/\tan\theta$$

In this fashion, the relative positions of the vehicle 12 corresponding to each captured image and the viewpoint of the TV camera 15 is calculated (step 24e). On the basis of the distance D when the vehicle 12 is on the optical axis 14 and the angle φ (see FIG. 1B) of the line joining either end of the section $L_1$ and the viewpoint of the TV camera 15 with respect to the optical axis 14 thereof, the distance of travel R of the vehicle 12 in the section $L_1$ is calculated by 2Dtanφ and the vehicle's velocity V is calculated by (N/30)/R. N is the number of images captured over the section $L_1$ at time intervals of 1/30 sec. Assuming, for example, that the point of intersection of the direction of travel 13 and the optical axis 14 is a reference point, the distance D at the time of the vehicle 12 reaching the reference point and the distance of movement x(t)=∫Vdt (∫ being 0 through t) of the vehicle 12 from the reference point are calculated. The vehicle's velocity V may also be calculated on the basis of the inclination of the tires' loci images 46a and 46b, that is, by the distance of movement X in the lateral direction/elapsed time T on the time axis.

Figure 9:
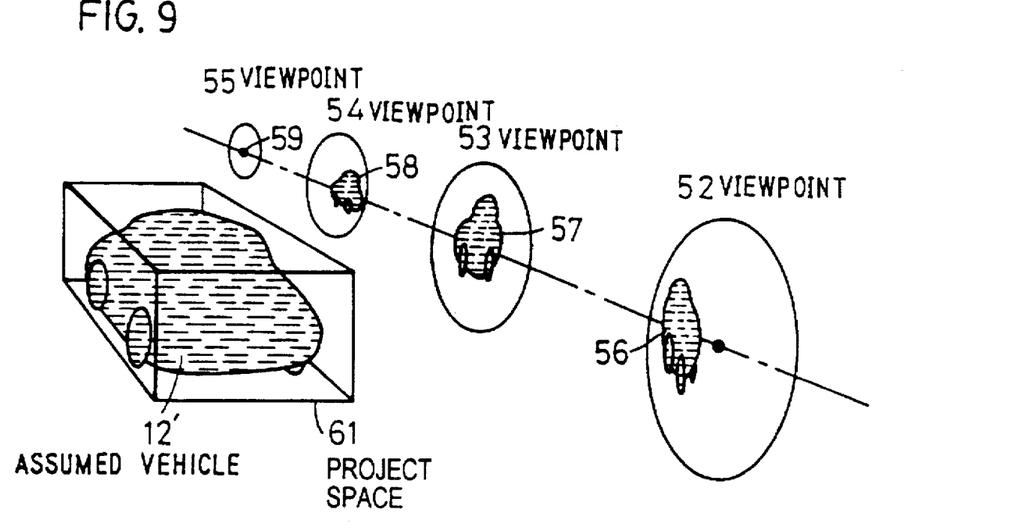
FIG. 9 is a diagram showing, byway of example, a projection space and respective silhouette images arrayed corresponding to the relative positions of the camera viewpoints and the moving object.

Next, in a shape extraction step 25, the relative positions of the vehicle 12 and the viewpoint of the TV camera 15, calculated for each captured image as described above, are used to reconstruct the shape of the vehicle 12 by projecting the silhouettes obtained in the silhouette extraction step 23, through use of the silhouette scheme. Now, suppose that, as shown in FIG. 9, a shape of assumed vehicle 12' is fixedly located in alignment with the viewpoint of the TV camera 15 (i.e. the center of the fish-eye lens 16) and is image-sensed by TV cameras with their viewpoints 52–55 held at the relative positions calculated in the relative position calculation step 24. Images 56–59, captured at the viewpoints 52–55 respectively match the silhouettes extracted in the silhouette extraction step 23 from the images captured when the vehicle 12 was at the viewpoints 52–55. Hence, the shape of the vehicle can be reconstructed by projecting each of the silhouettes corresponding to the images 56–59, extracted in the silhouette extraction step 23, into a projection space 61 assumed to be large enough to accommodate an assumed shape 21' of the vehicle 12 while holding the viewpoint of the TV camera 15 and the vehicle 21 at the above-noted positions relative to each other.

Figure 10:
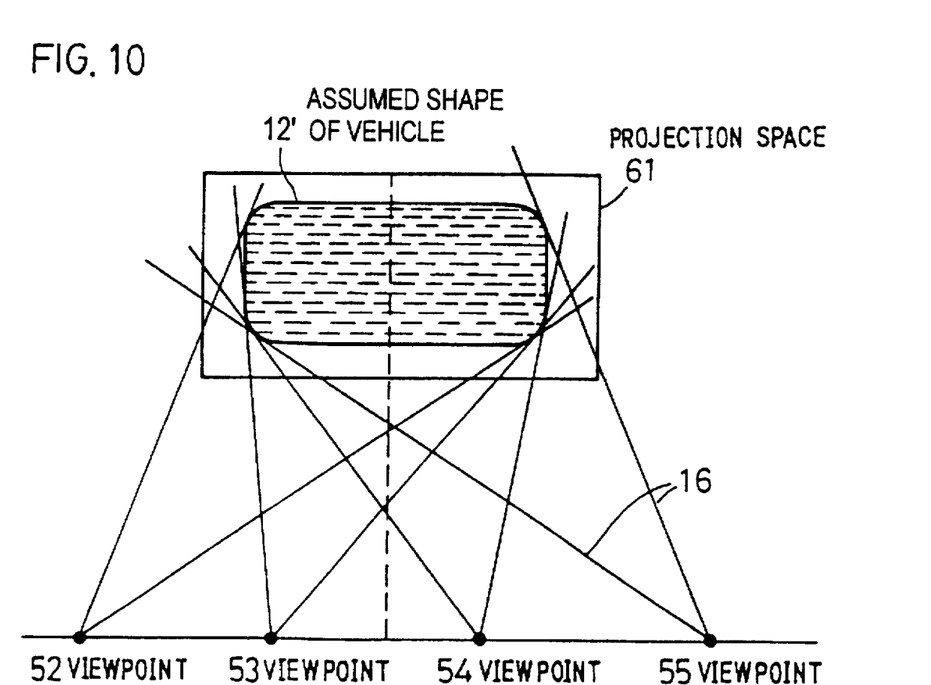
FIG. 10 is a diagram showing how to generate the shape of the moving object by projecting respective silhouettes onto the projection space.

In other words, as shown in FIG. 10, firstly, all voxels in which the assumed projection space 61 is divided are each set to "1", and the silhouettes at the viewpoints 52–55 are projected into the projection space 61, and then each voxel which inhibits the passage therethrough of the silhouette from each viewpoint is made a "0," by which the shape of the assumed vehicle 12' is reconstructed. In concrete terms, lines of view from every minute cubic space in the projection space 61 are determined and a check is made to see if the lines of view from every voxel of the projection space 61 to the respective viewpoints 52–55, when viewing the silhouettes there, fall inside or outside of the silhouettes. When all the lines of view are inside of the silhouettes, the voxel concerned is made a "1" and when this requirement is not met, the voxel is made a "0." The outer shape of the area where the voxel goes to a "1" forms part of the shape of the vehicle 12.

Figure 11:
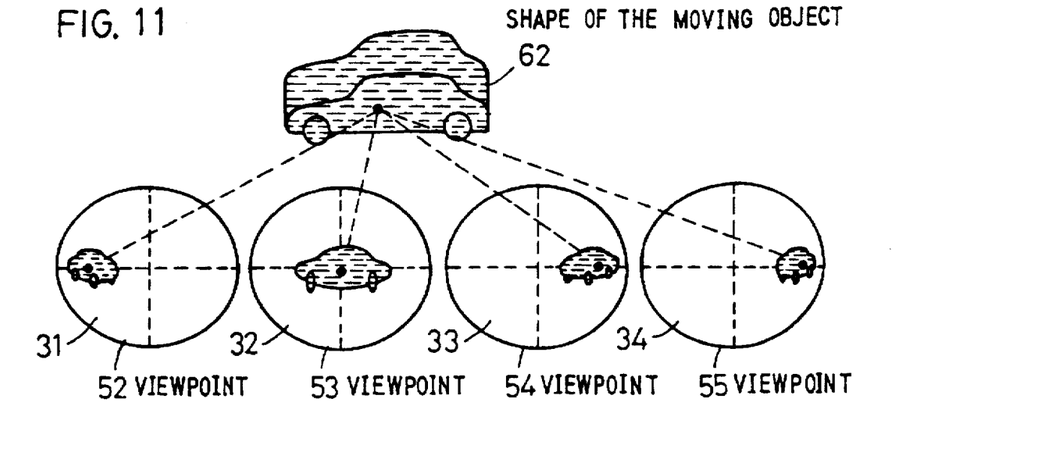
FIG. 11 is a diagram showing how corresponding pixel values in respective captured images are extracted from one voxel of the reconstructed shape of the moving object.

Further, surface features of the vehicle 12, such as a front grill or brake lights, are acquired as needed, in a surface feature acquiring step 26. That is, a surface feature area in the shapes extracted in the shape extraction step 25, as shown in FIG. 11, for example, is specified and the luminance of the corresponding pixels of the captured images 31–34 at the viewpoints 52–55, which do not cast a shadow over other voxels, is detected and the luminance of the highest occurrence or average luminance is used as the luminance of the voxel concerned. In this instance, the color of the corresponding pixel can be used instead of using the luminance. In this way, such statistical processing as obtaining highest occurrence of luminance or color or average of luminance or color is performed for each of the voxels in the area over which surface features are desired to obtain. This statistical processing may be performed all over the surface of the vehicle. This ensures avoidance of the influence of an area where the vehicle's windshield or metal parts temporarily exhibit specular reflection in a certain direction of a line of view, making the luminance or color of the respective pixel abnormal. Hence, information about the surface color of the moving object can be accurately obtained outdoors, in particular.

Figure 12:
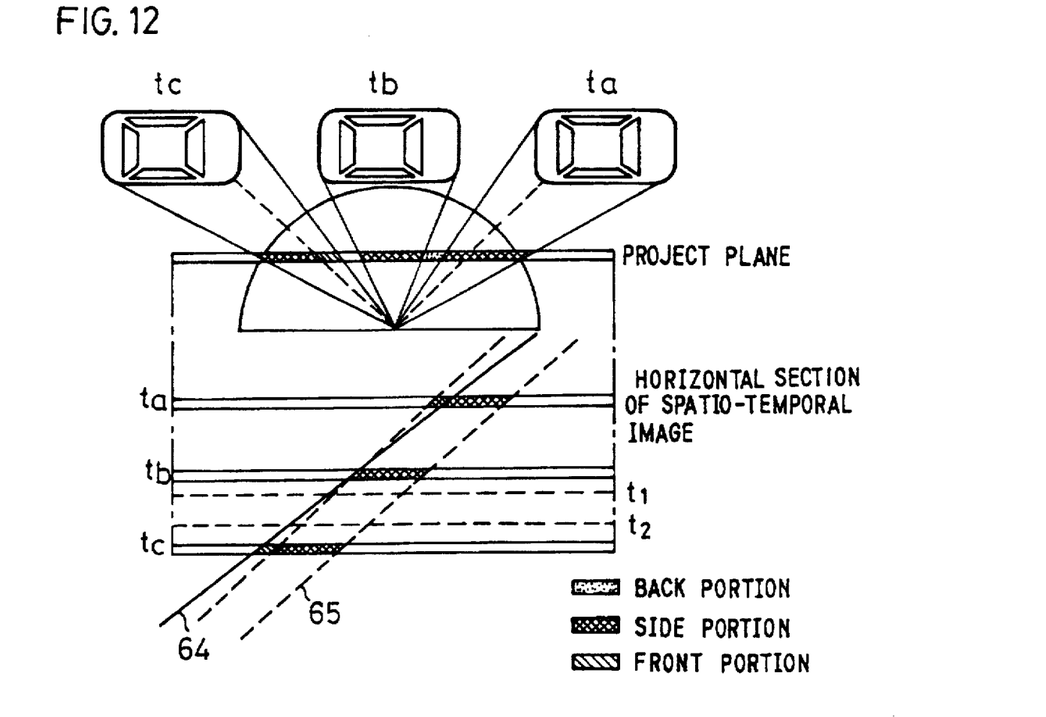
FIG. 12 is a diagram showing, by way of example, the relationship between both side segments indicating vehicle's speeds at both sides and respective vehicle's positions in a horizontal section image of the spatio-temporal image.

As shown in FIG. 12, segments 64 and 65 are calculated which represent the movement of the vehicle 12 at the side of the TV camera 15 and at the opposite side in the horizontal section of the spatio-temporal image, and velocities Va(t) and Vb(t) corresponding to the segments 64 and 65 are computed from the inclinations thereof. The width W of the vehicle 12 can be calculated by the following equation, using the velocities Va(t) and Vb(t).

$$W = D \left\{ \left[ \int_{t_1}^{t_2} Vb(m)dm / \int_{t_1}^{t_2} Va(n)dn \right] - 1 \right\}$$

In the case of a moving vehicle or similar object which is symmetrical with respect to the direction of its travel, data on the vehicle body on the opposite side, which is conventionally hidden from view, could be obtained by copying the reconstructed shape after folding it over along the center line of the shape in the direction of its width. Thus, a 3-D object can completely be reconstructed.

Figure 2:
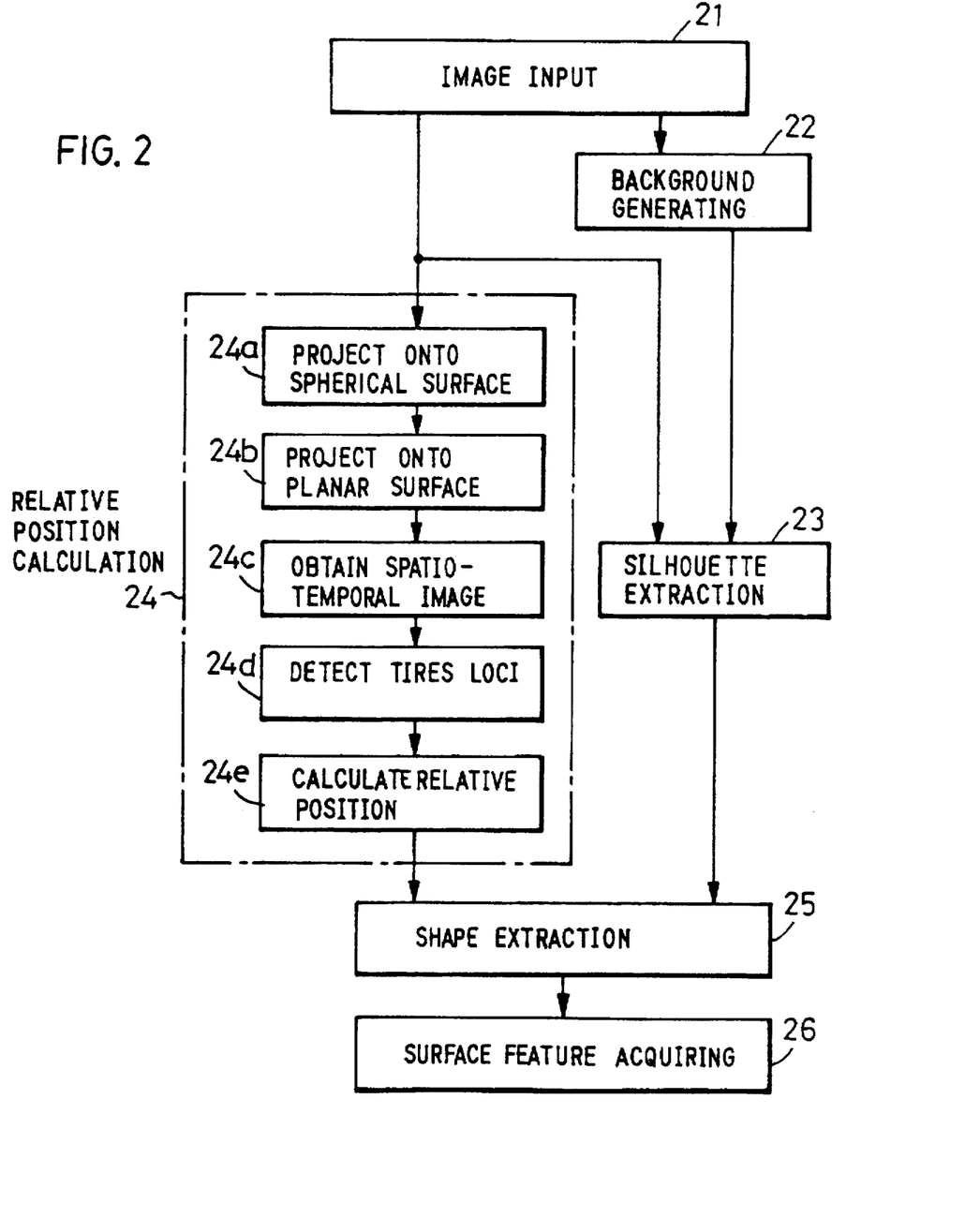
FIG. 2 is a flowchart for explaining an embodiment of this invention method.

The image processor 67 shown in FIG. 1A for the image processing shown in FIG. 2 is provided in the case 17, for instance, and the results of various processing are displayed on a display 68 mounted on the case 17. The image processor 67 and the display 68 may also be provided separately of the case 17.

Figure 13A:
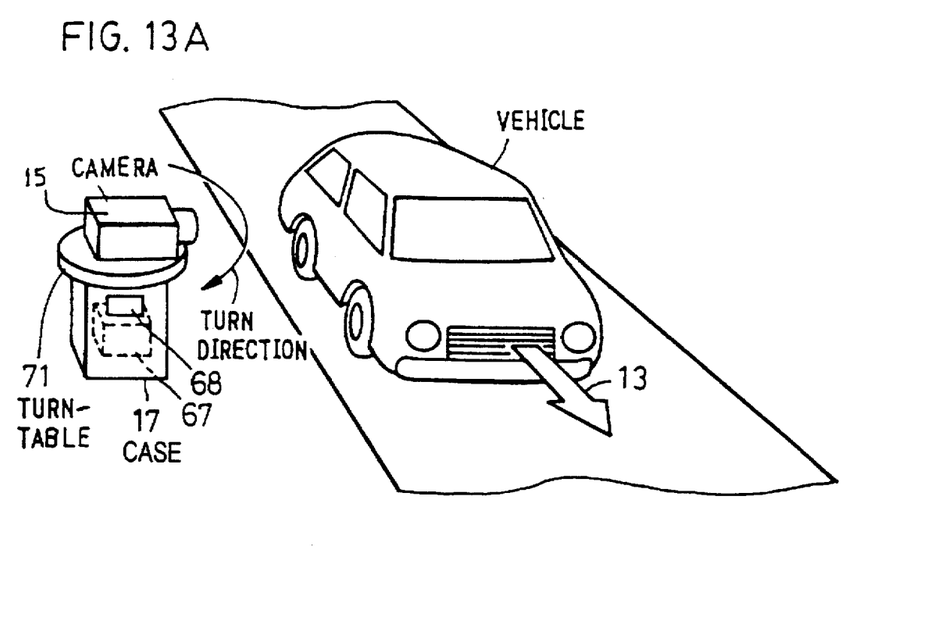
FIG. 13A is a perspective view illustrating another embodiment of this invention apparatus.
Figure 13B:
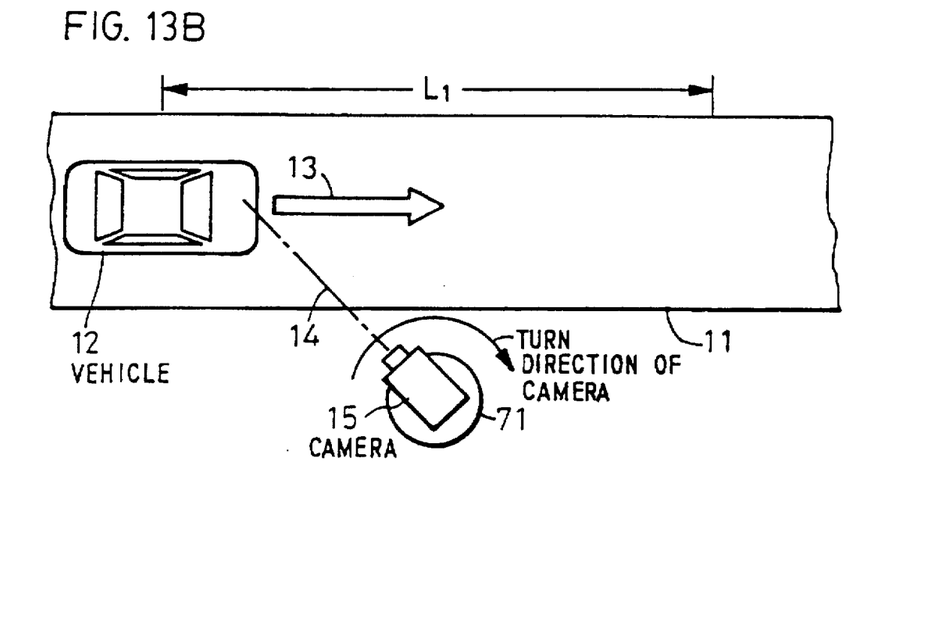
FIG. 13B is a plan view of the apparatus depicted in FIG. 13A.
Figure 14:
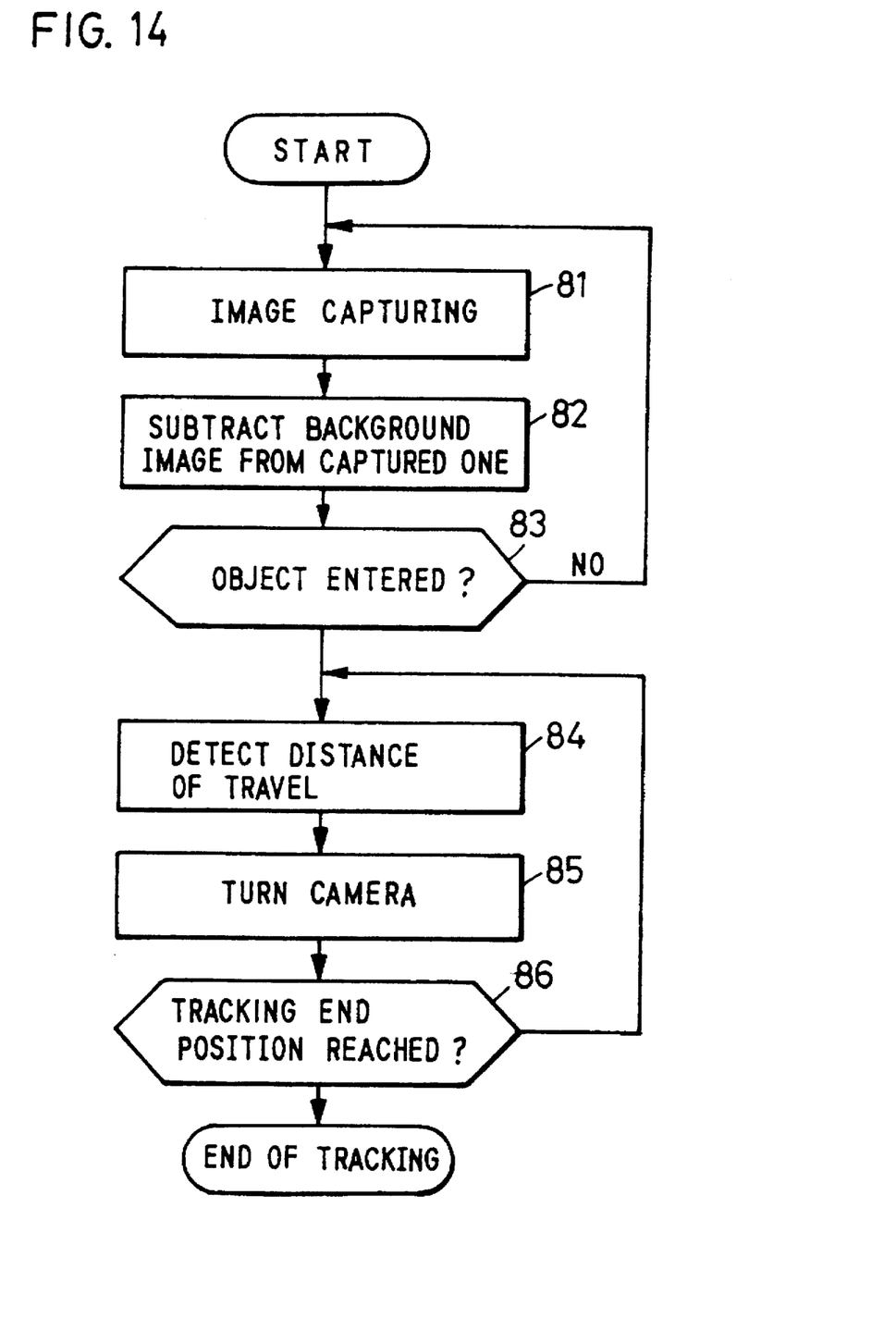
FIG. 14 is a flowchart showing an example of the procedure for the detection of a moving object coming into the camera's field of view and for causing the camera to keep track of the moving object.
Figure 15A:
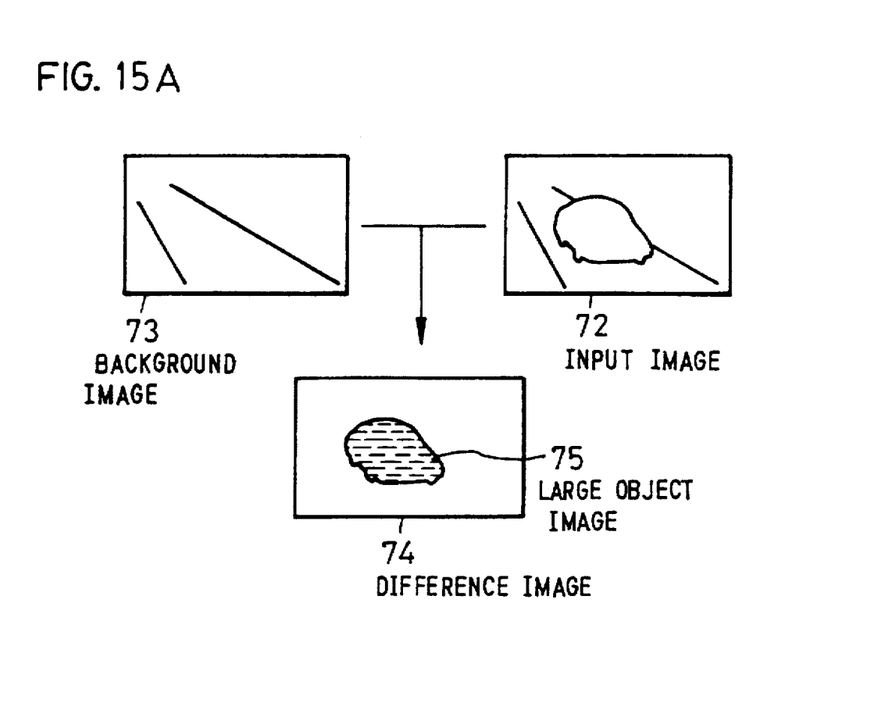
FIG. 15A is a diagram showing examples of a background image, an input image and the difference image in the processing of FIG. 14.

While in the above the TV camera 15 is fixed, it may also be designed to turn following the movement of the vehicle 12 to keep or capture it in the field of view of the camera 15 at all times. An example is shown in FIG. 13A, in which the parts corresponding to those in FIG. 1A are identified by the same reference numerals. In this example, a turntable 71 is mounted on the case 17 and the TV camera 15 is placed on the turntable 71; in this instance, there is no need of using a particularly wide-angle lens as the objective lens of the TV camera 15. The TV camera 15 on the turntable 71 is allowed to turn in the horizontal plane and its angular velocity is made controllable. The TV camera 15 needs only to be capable of turning its line of view from one end of the section $L_1$ to the other. In FIG. 14 there is shown an example of the procedure for turning the TV camera 15. When the vehicle 12 does not stay in the image-sensing section $L_1$, the TV camera 15 is on standby at its tracking start position while directing its line of view (the optical axis) 14 to one end of the section $L_1$ (see FIG. 13B). In this state, a check is made to see if the vehicle 12 enters the section $L_1$. That is, the TV camera 15 performs image sensing periodically, for instance, and the image is captured or grabbed (81), then a prepared background image is subtracted from the captured image (82) and it is determined whether the vehicle 12 has entered the section $L_1$, depending on whether a sufficiently large object image has been detected in the subtracted image (83). For example, as shown in FIG. 15A, when a large object image 75 is detected in the difference image 74 obtained by subtracting a separately prepared background image 73 from the input image 72, it is decided that the vehicle 12 has entered the section $L_1$. When no object larger than a predetermined value is detected, it is decided that no vehicle has come into the section $L_1$ and the process returns to the image capturing step (81); after a certain elapsed time the next image is captured.

Figure 15B:
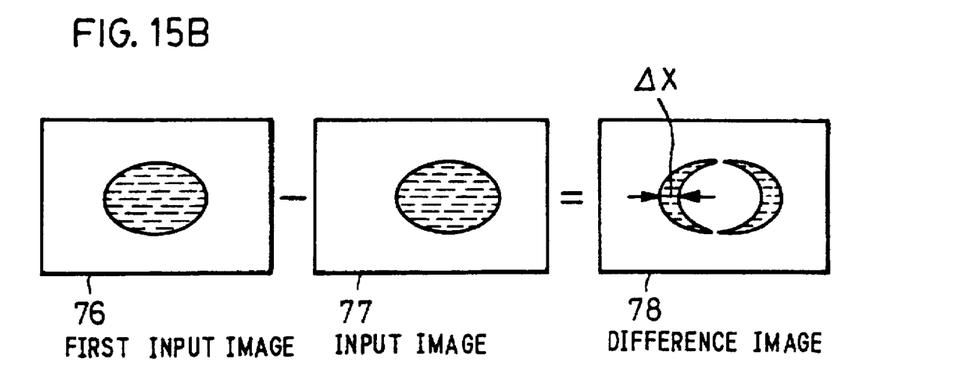
FIG. 15B is a diagram showing, by way of example, images of adjacent or successive frames, from which background images have been removed, and their difference images.
Figure 16A:
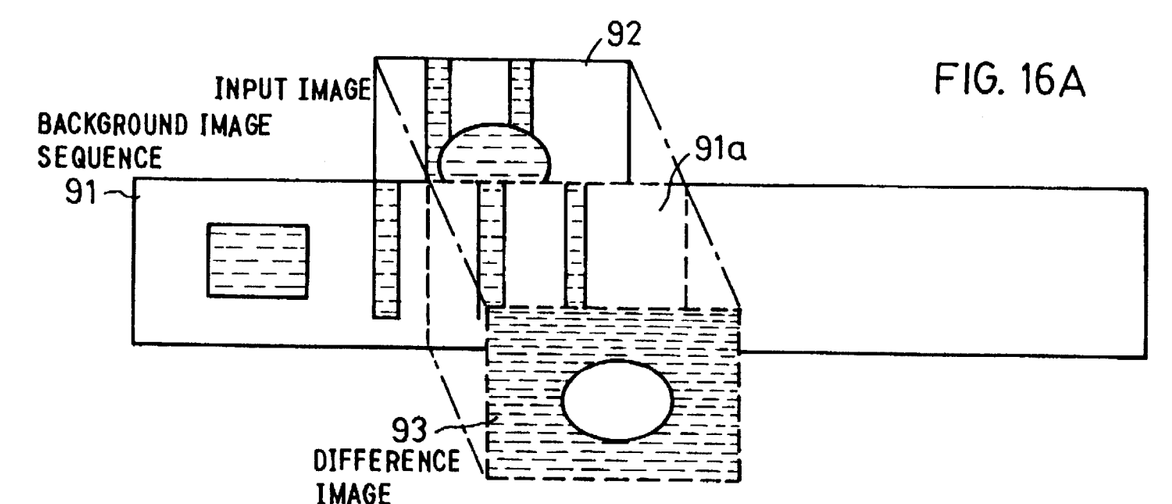
FIG. 16A is a diagram showing an example of the relationships of background, input and silhouette images in the embodiment of FIG. 13.
Figure 16B:
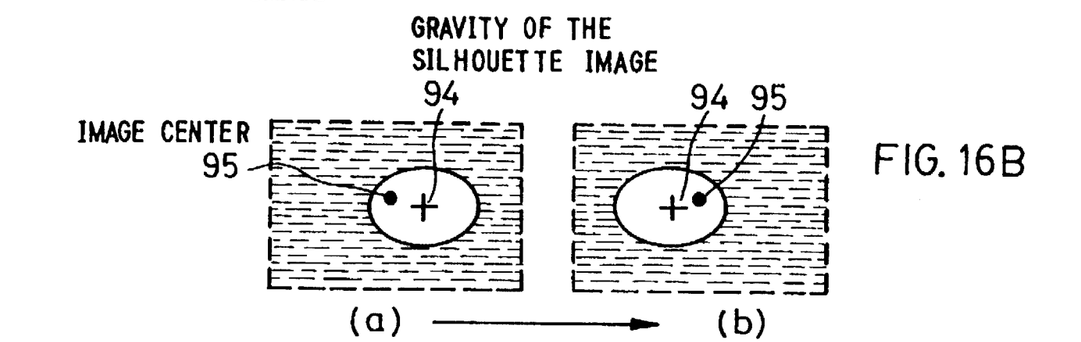
FIG. 16B is a diagram showing the relationship between the image center and the silhouette's gravity center.

When it is decided that the vehicle 12 has entered the section $L_1$, the difference between the immediately proceeding vehicle image remaining after the previous subtraction and the current vehicle image is detected, that is, the difference between the preceding and current frames is detected, by which the distance of movement of the vehicle 12 between the frames is detected (84). For example, as shown in FIG. 15B, the maximum value of the reining image in a difference image 78 between a first input image 76, for which it has been decided that the vehicle 12 entered the section $L_1$, and the next input image 77 is detected as the amount of movement ΔX, which is converted to angle information as in the case of spherical projection. This numerical value is used to determine the angular velocity of the TV camera 15 so that the vehicle 12 always remains in the field of vision, and the TV camera 15 starts to turn accordingly (85). As shown in FIG. 16A, once the TV camera 15 starts tracking the vehicle 12, a corresponding image area 91a in a separately prepared background image sequence 91 in the range of the turning movement of the TV camera 15 is taken out from the direction of the TV camera 15 at all times and is subtracted from the input image, by which an object silhouette image 93 is detected. The center of gravity of this silhouette is detected, then the distance between the detected center of gravity and the image center is calculated and the angular velocity of the TV camera 15 is adjusted accordingly. More specifically, if the center of gravity 94 of the silhouette image 93 is further to the right than the image center 95 as shown in FIG. 16B(a), then the turning speed of the TV camera 15 will be decreased, whereas when the center of gravity 94 is further to the left than the image center 95 as shown in FIG. 16B(b), then the turning speed of the TV camera 15 will be increased. This enables the TV camera 15 to keep track of the vehicle 12 in the field of view of the camera.

Next, it is determined on the basis of the rotational angle of the TV camera 15 whether its optical axis 14 has reached the tracking end position, that is, the other end of the section $L_1$ (86); if not, the process returns to step 84 wherein the intra-frame difference is calculated to detect the amount of movement ΔX. When it is decided that the TV camera 15 has turned a predetermined angle to reach the tracking end position, the vehicle tracking and image-sensing operation ends.

The images thus captured through the TV camera 15 tracking the vehicle 12 are each subjected, as the image captured in the image input step 21 in FIG. 2, to the subsequent processing to thereby reconstruct the shape of the vehicle 12. In this instance, in the spherical projection step 24a of the relative position calculation step 24, the rotational angle of the turntable 71 at the time when each image was captured is used to calculate the direction of the line of view of the TV camera 15 at that time, and the corresponding captured image is projected onto the spherical surface in that direction of the line of view. The subsequent processing is exactly the same as described previously.

In the process of FIG. 2, it is also possible to calculate the logical product of the silhouette extracted in the step 23 and the corresponding captured image to cancel the influence of the background image and to subject the resulting image to the processing of the relative position calculating step 24. In the embodiment of FIG. 1, the fish-eye lens 16 need not always be used but may also be an ordinary wide-angle lens; in some cases, an ordinary lens, not called a wide-angle lens, may be used.

That is, the fish-eye lens 16 needs only to hold one or both of the sides of the moving object corresponding to the direction of its travel, that is, one or both of the front and back of the vehicle 12 in the field of view of the TV camera 15. Hence, in the case of a moving object whose length in the direction of its travel is shorter than in the direction perpendicular thereto, there is no particular need of using a wide-angle lens. A cylindrical lens may be used as the fish-eye lens 16.

In both embodiments of FIGS. 1 and 13, when front and rear halves of the vehicle 12 in the direction of its travel are symmetrical, the shape of such one half portion can be reconstructed even if image-sensed before or after the moving object reaches the position of the TV camera 15; accordingly, the image-sensing of the moving object need not be conducted until after it passes the TV camera 15. The optical axis 14 of the TV camera 15 need not be held at right angles to the direction of travel of the vehicle 12 and it may be tilted up to 45 degrees or so. Similarly, also when the feature desired to obtain is part of the moving object, for example, its front alone, the image-sensing may be conducted only before or after the moving object reaches the position of the TV camera 15.

In both embodiments of FIGS. 1 and 13, too, when the optical environment (optical conditions) does not abruptly change as in the case of the moving object indoors, it is possible to omit the background image generating step 22 and prepare one background image for subsequent use in the silhouette extraction step 23.

In the FIG. 1 embodiment, when the speed of the moving object is low, the image-sensing period is extended correspondingly or captured images every predetermined number of frames are subjected to required processing and the other captured images may be discarded. When the speed of the moving object changes in the section $L_1$ and slows down or stops, the image-sensing repetition period is extended or the acquired images at that time are utilized for processing at intervals of a proper number of frames so as to avoid an unnecessary increase in the amount of processing. In the case of reconstructing the outer shape of an object being carried on a belt conveyor, for example, it is sufficient to obtain an image of the moving locus of the contact point of the object with the conveyor, in place of the tires' loci images in the foregoing embodiments. In the embodiment of FIG. 13, a sensor may be used to detect approaching of the moving object and the TV camera 15 may be caused to start capturing its image upon detection of the moving object.

As described above, according to the present invention, a plurality of images of a moving object are captured through a TV camera fixed or allowed to turn following its movement and the shape of the moving object can be reconstructed using the captured images. Accordingly, the moving object need not be mounted on a turntable; so that the shape of any object can be reconstructed regardless of its size or weight. Since a plurality of TV cameras are not used, there is no need of positioning them relative to each other and adjusting their characteristics.

In the case of generating the background image and obtaining a silhouette through subtraction, even if the background varies, for example, even if the sunlight changes in an outdoor scene, in particular, the silhouette of the moving object can accurately be extracted without being affected by the change in the background.

Furthermore, the statistic processing of the surface feature of the moving object ensures avoidance of the influence of a temporary specular reflection or the like, and hence permits acquisition of a correct surface texture or surface color even in an outdoor scene.

It will be apparent that many modifications and variations may be effected without departing from the scope of the novel concepts of the present invention.

What is claimed is:

1. A method for acquiring a feature of a moving object, said method comprising:
   an image capturing step using a fixed TV camera for performing image-sensing of said moving object at least two times along a predetermined section of the path of travel of said moving object from a position on a line crossing the path of travel of said moving object;
   a silhouette extraction step for calculating the difference between each image of said moving object captured by said TV camera and its background image to generate a silhouette for said each image of said moving object;
   a relative position calculation step for calculating the relative positions of the viewpoint of said TV camera and said moving object on the basis of information about a surface feature point of said moving object in said each image; and
   a shape extraction step for extracting the shape of said moving object as a reconstructed shape by projecting said silhouette of said each image into a three-dimensional projection space assumed to be large enough to accommodate an assumed version of the shape of said moving object on the assumption that said viewpoint of said TV camera and said moving object are held at said relative positions.

2. The method of claim 1, which further comprising a step of generating said background image from said images captured by said TV camera.

3. A method for acquiring a feature of a moving object, said method comprising:
   an image capturing step using a TV camera for performing image-sensing of said moving object at least two times along a predetermined section of the path of travel of said moving object while turning the line of view of said TV camera to keep track of said moving object in its field of view at all times;

a silhouette extraction step for calculating the difference between each image of said moving object captured by said TV camera and its background image to generate a silhouette for said each image of said moving object;

a relative position calculation step for calculating the relative position of the center of turning of said line of view of said TV camera and said moving object on the basis of information of a surface feature point of said moving object in said each image; and a shape extraction step for acquiring the shape of said moving object by projecting said silhouette of said each image into a three-dimensional projection space assumed to be large enough to accommodate an assumed version of the shape of said moving object on the assumption that the center of turning of said line of view of said TV camera and said moving object are held at said relative positions.

4. The method of claim 3, which further comprises a background image generating step for generating a background image form said images captured by said TV camera.

5. The method of any one of claims 1 through 4, wherein said relative position calculation step comprises the steps of: projecting each of said images captured by said TV camera onto a spherical surface to form a spherical projection image; projecting each said spherical projection image onto a planar surface to form a planar projection image; arraying said planar projection images onto a time axis to generate a spatio-temporal image; detecting a ground-contact-line image of said moving object from said spatio-temporal image; and calculating a perpendicular angle at which to view a ground-contact-line corresponding to said detected ground-contact-line image to thereby calculate said relative positions of said moving object and said TV camera.

6. The method of claim 5, wherein said relative position calculation step for said moving object comprises the steps of: calculating the distance between said TV camera and said moving object at a predetermined position from said perpendicular angle at said predetermined position; calculating the speed of said moving object from the inclination of said detected ground-contact-line image; and calculating the distance of travel of said moving object from said predetermined position on the basis of said speed of said moving object and the time elapsed from the capturing of the image of said moving object at said predetermined position to the capturing of another image of said moving object.

7. The method of any one of claims 1 through 4, which further comprises a step of splitting into minute patches a part of said reconstructed shape of said moving object corresponding to a surface thereof desired to observe, acquiring luminance, color or similar information on the patches of each captured image corresponding to said patches, and statistically processing said information for said patches to obtain their value.

8. The method of claim 1 or 2, wherein said TV camera has a wide-angle lens.

9. The method of claim 1 or 2, which further comprises the steps of: projecting each of said images captured by said TV camera onto a spherical surface to obtain a spherical projection image; projecting each of said spherical projection images onto a planar surface to obtain a planar projection image; arraying said planar projection images on a time axis to generate a spatio-temporal image; obtaining, from said spatio-temporal image, images of loci of parts of said moving object at the side facing said TV camera and the side opposite therefrom; and calculating speeds of said moving object from the inclinations of said images of said loci to calculate the width of said moving object.

10. The method of claim 3 or 4, which further comprises the steps of: detecting the entering of said moving object into said predetermined section; and, upon detection of the entering of said moving object in said predetermined section, starting said image capturing step, detecting the speed of said moving object, and controlling the turning movement of said TV camera as a function of said detected speed.

11. The method of claim 10, wherein said step of detecting the entering of said moving object into said predetermined section is a step of always image-sensing the scene in the vicinity of one end of said predetermined section by said TV camera, removing a background image from each captured image, and deciding that said moving object has entered said predetermined section when an image larger than a predetermined size is detected in the remaining image.

12. The method of claim 11, wherein said speed of said moving object is detected from the size of the inter-frame difference of said remaining image in the direction of travel of said moving object.

13. An apparatus for acquiring a feature of a moving object, said apparatus comprising:

a stationary TV camera disposed apart from a path of travel of said moving object, for performing image-sensing of said moving object at least two times in a predetermined section of said path of travel, said TV camera having a wide-angle objective lens; and an image processor which generates a silhouette of said moving object by subtracting a background image from each image captured by said TV camera, calculates the relative positions of the viewpoint of said TV camera and said moving object on the basis of information about a surface feature point of said moving object in each image captured by said TV camera, and reconstructs the shape of said moving object by projecting said silhouette of said moving object into a three-dimensional projection space while holding said viewpoint of said TV camera and said moving object at said relative positions.

14. An apparatus for acquiring a feature of a moving object, said apparatus comprising:

a TV camera disposed apart from a path of travel of said moving object, for image-sensing said moving object at least two times in a predetermined section of said path of travel;

means for turning said TV camera so that said moving object having entered said predetermined section stays in the field of view of said TV camera; and an image processor which generates a silhouette of said moving object by subtracting a background image from each image captured by said TV camera, calculates the relative positions of the turning center of said TV camera and said moving object on the basis of information about a surface feature point of said moving object in each image captured by said TV camera, and reconstructs the shape of said moving object by projecting said silhouette of said moving object into a three-dimensional projection space while holding said turning center of said TV camera and said moving object at said relative positions.

* * * * *